United States Patent
McHugh et al.

(10) Patent No.: US 12,532,935 B2
(45) Date of Patent: Jan. 27, 2026

(54) NON-NEWTONIAN HELMET INSERT

(71) Applicant: FluxMotion, LLC, North Canton, OH (US)

(72) Inventors: Benjamin McHugh, Cleveland, OH (US); Brian Glahn, Bozeman, MT (US)

(73) Assignee: FluxMotion, LLC, North Canton, OH (US)

( * ) Notice: Subject to any disclaimer, the term of this patent is extended or adjusted under 35 U.S.C. 154(b) by 387 days.

(21) Appl. No.: 18/118,181

(22) Filed: Mar. 7, 2023

(65) Prior Publication Data

US 2023/0329384 A1  Oct. 19, 2023

Related U.S. Application Data

(60) Provisional application No. 63/331,996, filed on Apr. 18, 2022.

(51) Int. Cl.
| | | |
|---|---|---|
| *F16F 13/10* | (2006.01) | |
| *A42B 3/12* | (2006.01) | |
| *F16F 13/08* | (2006.01) | |

(52) U.S. Cl.
CPC ............ *A42B 3/121* (2013.01); *F16F 13/102* (2013.01); *F16F 13/08* (2013.01); *F16F 13/10* (2013.01); *F16F 2224/041* (2013.01)

(58) Field of Classification Search
CPC .......... F16F 13/08; F16F 13/10; F16F 13/108; F16F 2224/041; A42B 3/121
See application file for complete search history.

(56) References Cited

U.S. PATENT DOCUMENTS

| | | | |
|---|---|---|---|
| 10,561,192 B2 | 2/2020 | Weber et al. | |
| 11,147,335 B2 | 10/2021 | Pomering et al. | |
| 11,197,511 B2 | 12/2021 | Keevy et al. | |
| 11,229,253 B2 | 1/2022 | Wetzel et al. | |
| 2009/0077723 A1* | 3/2009 | Mead | F16F 13/04 2/455 |
| 2009/0286910 A1* | 11/2009 | Bloomfield | C08L 53/025 524/269 |
| 2010/0300798 A1* | 12/2010 | Sereboff | G10K 11/165 220/660 |
| 2013/0061739 A1* | 3/2013 | Cheong | F41H 5/0485 428/317.1 |
| 2013/0296755 A1* | 11/2013 | Duncan | A61F 5/05883 602/18 |
| 2015/0083024 A1* | 3/2015 | Zicker | C08B 30/14 106/211.1 |
| 2018/0187732 A1* | 7/2018 | Beck | F16D 65/56 |
| 2018/0279692 A1* | 10/2018 | Witek | A41C 5/00 |
| 2020/0000169 A1* | 1/2020 | Reinhall | A42B 3/121 |

(Continued)

FOREIGN PATENT DOCUMENTS

| | | | | |
|---|---|---|---|---|
| WO | WO-2010076257 A2 * | 7/2010 | | A41D 13/0156 |
| WO | WO-2013158510 A1 * | 10/2013 | | C08B 30/14 |

*Primary Examiner* — Thomas J Williams
(74) *Attorney, Agent, or Firm* — Kramer Law Clinic

(57) ABSTRACT

A helmet insert, comprising a bladder member and a non-Newtonian fluid disposed within the bladder member. The non-Newtonian fluid has an oil, a settling agent, cornstarch, and water in a preselected ratio. The ratio of the oil, the settling agent, the cornstarch and the water is in a weight range between 50-75% oil, 1-10% settling agent, 15-30% cornstarch, and 1-20% water.

14 Claims, 4 Drawing Sheets

(56) References Cited

U.S. PATENT DOCUMENTS

2020/0022443 A1\* 1/2020 Wetzel .................. A42B 3/121
2020/0221804 A1   7/2020 Morgan et al.
2020/0221807 A1\* 7/2020 Morgan ................ A42B 3/121
2023/0329384 A1\* 10/2023 McHugh ............... A42B 3/121

\* cited by examiner

NON-NEWTONIAN HELMET INSERT

RELATED APPLICATIONS

This application claims priority to U.S. Prov. Application Ser. No. 63/331,996 filed on Apr. 18, 2022, which is expressly incorporated herein by reference.

BACKGROUND

Helmets today are designed to protect skull fracture and the protection provided is optimized only for high-speed impacts. Users are still susceptible to low and high-speed impacts and traumatic brain injury at high speeds. Some helmets don't protect against injuries sustained from the rotation of a user's brain.

Some athletic helmets utilize an expanded polystyrene ("EPS") foam liner to prevent a skull from fracturing. This EPS liner is not adequate at lowering accelerations to the brain. This holds especially true for impact speeds that fall outside of the EPS helmet liner design.

Using a damping system in a helmet, the level of force applied to the head during impact can be kept even, which can prevent more serious injuries. When there are fluctuations in the level of force applied to a human brain during impact, the brain injuries and skull fractures can become more severe.

One such damping system is a non-Newtonian fluid insert. Cornstarch and water can be combined to create a non-Newtonian fluid. However, this mixture can experience sedimentation of the cornstarch after prolonged periods of little or no agitation. While the addition of water can combat sedimentation, the water mixture can cause mold or can cause the mixture to freeze.

Thus, providing a helmet insert that effectively maintains the level of force applied to a user's head is desirable. Additionally, there exists a need to provide a non-Newtonian fluid that does not produce mold, freeze, or sediment.

BRIEF DESCRIPTION

According to one aspect, a helmet insert includes a bladder member and a non-Newtonian fluid disposed within the bladder member. The non-Newtonian fluid has an oil, a settling agent, cornstarch, and water in a preselected ratio. The ratio of the oil, the settling agent, the cornstarch, and the water is a weight range between 50-75% oil, 1-10% settling agent, and 15-30% cornstarch, and 1-20% water.

According to another aspect, a method for producing a helmet insert includes providing a bladder member, an oil, a settling agent, cornstarch, and water, and mixing the oil, the settling agent, the cornstarch and the water to form a non-Newtonian fluid; The method also includes opening the bladder member, depositing the non-Newtonian fluid therein, and closing the bladder member.

BRIEF DESCRIPTION OF THE DRAWINGS

The accompanying drawings, which are incorporated in and constitute a part of the specification, illustrate various systems, methods, devices, and other embodiments of the disclosure. It will be appreciated that the illustrated element boundaries (e.g., boxes, groups of boxes, directional lines, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
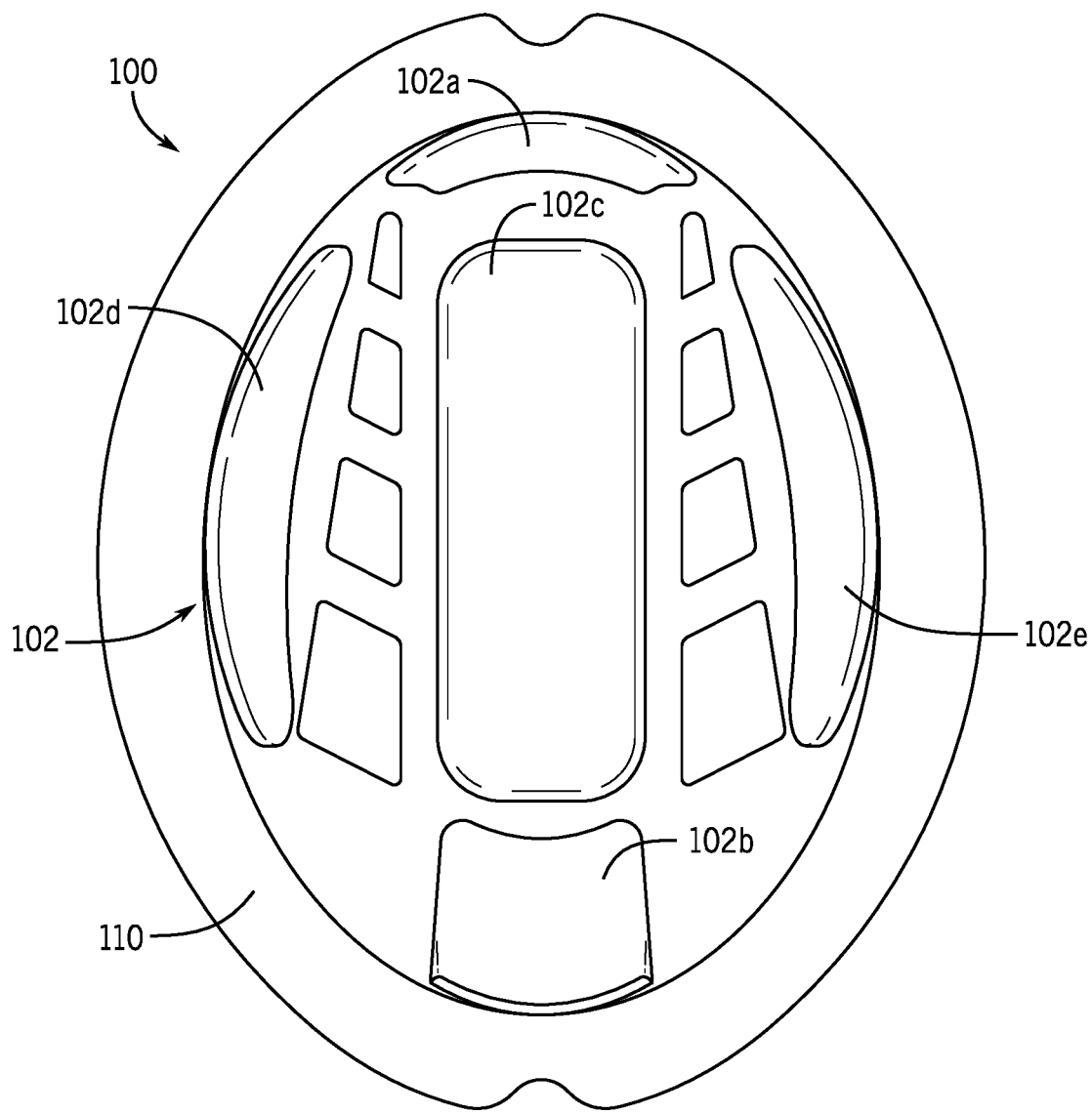
FIG. 1 is an isometric view of an insert within a helmet according to one exemplary embodiment.

The following describes a system and method related to a helmet insert for athletic helmets. More specifically, the embodiments described herein are directed to a helmet insert, generally indicated by reference numerals 100 in FIGS. 1 and 200 in FIG. 2A. Although FIGS. 1 and 2A show different configurations of a helmet insert, it is understood that similarly numbered elements in the figures correspond to like numbered elements and that the helmet insert 100 can include the same or similar components and/or capabilities as the helmet insert 200 and vice versa.

Figure 2A:
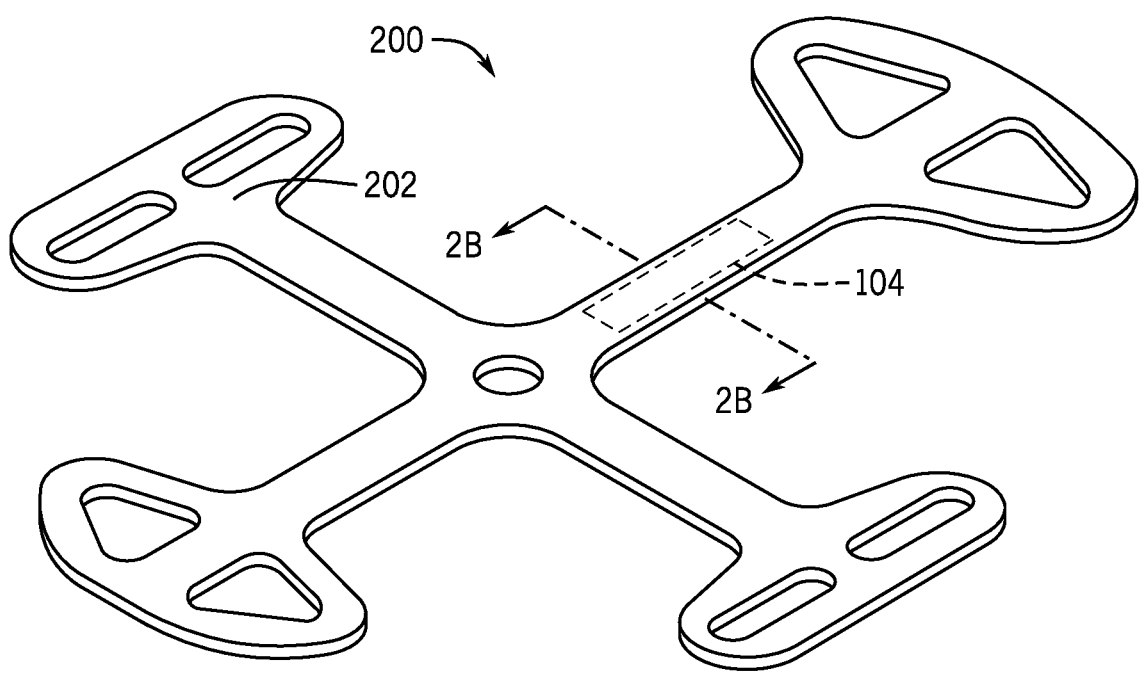
FIG. 2A is an isometric view of an insert according to another exemplary embodiment.

According to the embodiment shown in FIG. 1, the helmet insert 100 is shown within a helmet 110. The helmet insert 100 comprises a bladder member 102 and a non-Newtonian fluid 104 (see FIGS. 2A, 2B), which will be described in more detail herein, disposed within the bladder member 102. In one embodiment, the bladder member 102 is made of a plastic film. More specifically, the plastic film is a thermoplastic polyurethane ("TPU"). TPU films have higher durability, higher chemical resistance, and improved hydrolytic stability compared to other plastics.

As mentioned above, the helmet insert 100 is shown within a helmet 110. It is understood that any type of helmet can be implemented with the helmet insert 100 described herein. In some embodiments, the bladder member 102 is attached through a hook-and-loop fastener such as those sold under the Velcro® trademark. One side of the Velcro® is attached to the bladder member 102 and the complimentary piece of Velcro® is attached to the inside of the helmet 110. In alternate embodiments, glue, tape, clips, or frames may be used to secure the bladder member 102 to the inside of the helmet 110.

The bladder member 102 may include multiple segments inside of the helmet 110. In the embodiment shown in FIG. 1, there are five segments of the bladder member 102: a front bladder member 102a located at the front of the helmet 110, a back bladder member 102b located at the back of the helmet 110, a center bladder member 102c located at the center and/or top of the helmet 110, a first side bladder member 102d located on the left side of the helmet 110, and a second side bladder member 102e located on the right side of the helmet 110. In other embodiments there may be any desired number of segments and the segments may be amorphous or have any variation of a preferred geometry. In some embodiments, as the number of segments of the bladder member 102 increase the relative size of the segments will decrease. It is understood that regardless of the number and size of the individual segments of the bladder member 102, the overall size of the bladder member 102 will be slightly less than the inside of the helmet 110. Therefore, the size of the bladder member 102 will not prevent a user from wearing the helmet 110.

Figure 3:
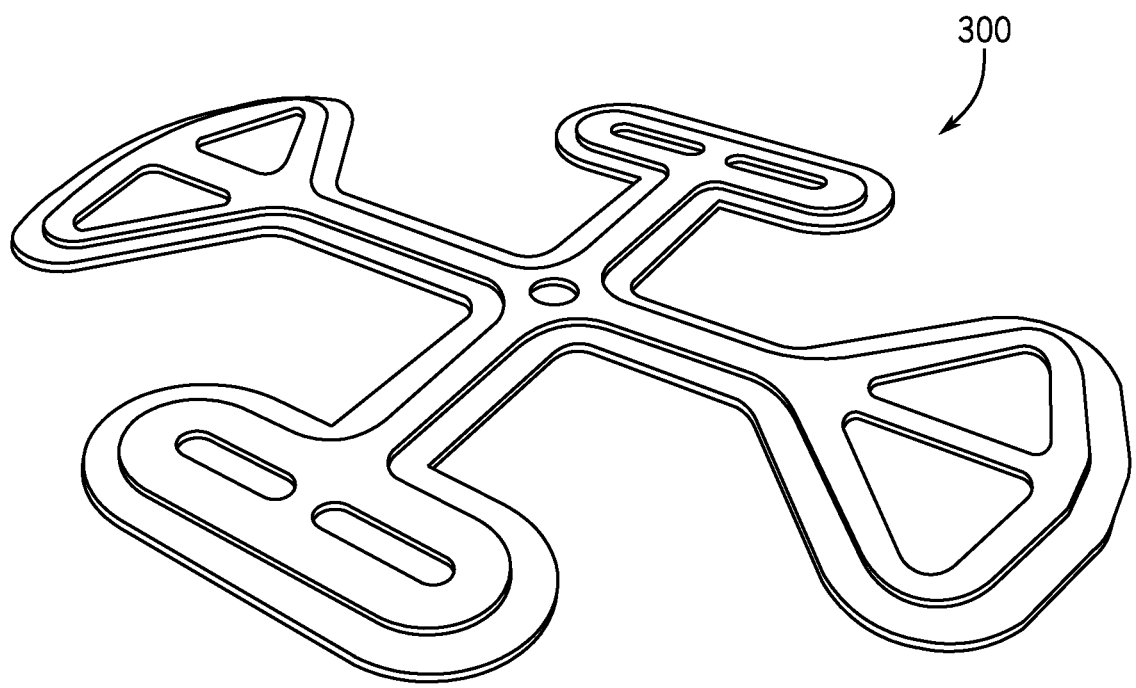
FIG. 3 is an isometric view of a mold (male component mode) used in making an insert according to one exemplary embodiment.

Although FIG. 1 shows the segments of the bladder member 102 separated (e.g. not connected), however, in other embodiments, one or more of the segments of the bladder member 102 can be connected. For example, an alternative embodiment is shown by the helmet insert 200 in FIG. 2A. In contrast to FIG. 1, the helmet insert 200 is not shown within a helmet, however, it is understood that the helmet insert 200 can be implemented similarly within a helmet 110. In FIG. 2A, the helmet insert 200 comprises a bladder member 202 and a non-Newtonian fluid 104. The segments of the bladder member 202 are connected with connector pieces of the bladder member 202 so the bladder member 202 is one unitary piece. Generally, the bladder member 102 and the bladder member 202 can be created from a mold. For example, FIG. 3 illustrates a mold 300 configured to provide up to five different shapes for segments of the bladder member 202. The mold 300 is for a male component of the bladder member 202. It is understood that a corresponding female mold (not shown) can be used with the mold 300 to create the bladder member 202.

Figure 2B:
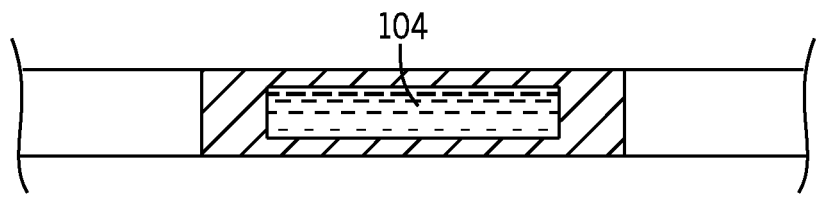
FIG. 2B is a cross section view of the insert of FIG. 2A showing a non-Newtonian fluid therein according to one exemplary embodiment.

Referring again to FIG. 2A, the helmet insert 200 comprises the bladder member 202 and the non-Newtonian fluid 104 disposed within the bladder member 102. FIG. 2B is a cross section view of the helmet insert 200 of FIG. 2A showing the non-Newtonian fluid 104 therein according to one exemplary embodiment. In FIG. 2B, the horizontal lines are a cross-sectioning pattern representing the non-Newtonian fluid 104 from the perspective of looking inside a cavity of the helmet insert 200. The diagonal lines are a cross-sectioning pattern in the solid portion of the helmet insert 200 cut through along line 2B-2B in FIG. 2A.

The non-Newtonian fluid 104 will now be discussed in more detail. As shown in Table 1 below, the non-Newtonian fluid 104 has an oil, a settling agent, a cornstarch, and water in a preselected weight ratio in a range between 50-75% oil, 1-10% settling agent, 15-30% cornstarch, and 1-20% water. In a preferred embodiment, the ratio is 64% oil, 5% settling agent, 22% cornstarch, and 9% water. The oil is preferably glycerin, and the settling agent is preferably dish detergent.

TABLE 1

| Component | Oil | Settling Agent | Cornstarch | Water |
| --- | --- | --- | --- | --- |
| Range of Ratio (wt. %) | 50-75 | 1-10 | 15-30 | 1-20 |
| Preferred Ratio (wt. %) | 64 | 5 | 22 | 9 |

The oil, the settling agent, cornstarch, and water combine to form the non-Newtonian fluid 104. The non-Newtonian fluid 104 adjusts its properties in response to an impact. The speed of the impact determines how the non-Newtonian fluid 104 will respond. The response of the non-Newtonian fluid 104 being variable relative to the speed during impact allows for greater protection of a human skull from fracture and from traumatic brain injury.

The water and the cornstarch form the base of the non-Newtonian fluid 104. One issue with having just water and the cornstarch is that the fluid would start to freeze once the ambient temperature dropped below the freezing point of the water. Another issue with the water and cornstarch is that the mix would start to become moldy after about a week or seven days. These problems are addressed by adding the oil to the solution of the water and the cornstarch.

The oil causes the freezing point of the non-Newtonian fluid to decrease so the initial problem of the non-Newtonian fluid 104 freezing at ambient temperatures below the freezing point of the water is reduced. The oil also helps to prevent the non-Newtonian fluid 104 from becoming moldy. This increases the life of the non-Newtonian fluid 104 and allows the non-Newtonian fluid 104 to respond more consistently to impacts at all speeds.

The settling agent aids in the wetting of the cornstarch during the mixing process. Wetting of the cornstarch allows for the non-Newtonian fluid 104 to mix more consistently and therefore respond more consistently to all impacts. The settling agent is dish detergent in the present embodiment. In other embodiments, the settling agent may include baking soda, citrus drink powder, borax, or any other agent that has properties that aid in wetting of the cornstarch.

Figure 4:
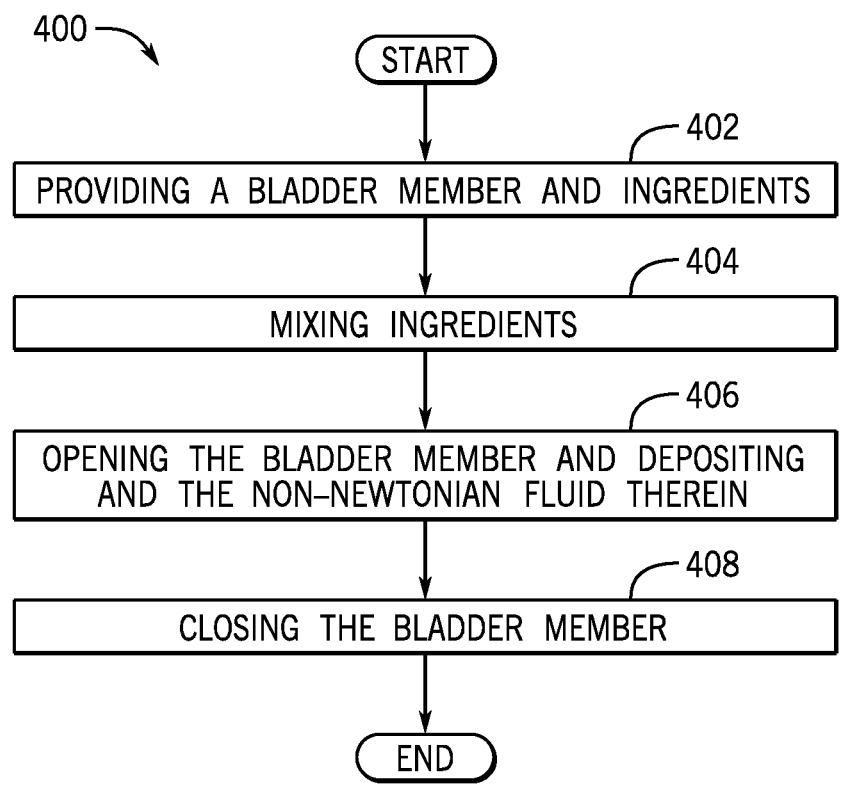
FIG. 4 is a flowchart illustrating the process of producing an insert according to one exemplary embodiment.

FIG. 4 shows a visual depiction of a method 400 for producing the helmet insert 100 and/or the helmet insert 200 according to one embodiment. At block 402, method 400 includes providing the bladder member 102, oil, settling agent, cornstarch, and water. In some embodiments, the mold 300 along with a corresponding female component mold (not shown) are formed to create the bladder member 102. More specifically, a film is placed over a form and the edges are clamped down along the form. Air (e.g., a vacuum pump) and heat (e.g., a heat gun) are used to mate the film to the form. When the formed film is cooled, it can be filled with the non-Newtonian fluid 104 as discussed herein.

At block 404, the method 400 includes mixing the oil, settling agent, cornstarch, and water to form a non-Newtonian fluid 104. At block 406, the method 400 includes opening the bladder member 102 and depositing the non-Newtonian fluid 104 therein. In some embodiments, after mixing at block 400, a syringe is filled with the non-Newtonian fluid 104. The syringe can be used to inject the non-Newtonian fluid 104 into the bladder member 102. More specifically, in one embodiment, the formed film (discussed above at block 402) is placed into a concave form and the pre-filled syringe is used to inject the fluid into the concavity of the film.

At block 408, the method 400 includes closing the bladder member 102. In some embodiments, a second piece of film is placed over the filled film and heat is applied (e.g., greater than 325° F.) to the interfacing edges of the two films to seal and form the bladder member 102. For example, a iron can be used to apply the heat. This method results in the helmet insert 100 and/or the helmet insert 200 as described herein.

It will be appreciated that various embodiments of the above-disclosed and other features and functions, or alternatives or varieties thereof, may be desirably combined into many other different systems or applications. Also, various presently unforeseen or unanticipated alternatives, modifications, variations or improvements therein may be subsequently made by those skilled in the art which are also intended to be encompassed by the following claims.

The invention claimed is:

1. A helmet insert, comprising:
a bladder member; and
a non-Newtonian fluid disposed within the bladder member wherein the non-Newtonian fluid has an oil, a settling agent, cornstarch, and water in a preselected ratio wherein the ratio of the oil, the settling agent, the cornstarch and the water is in a weight range between 50-75% oil, 1-10% settling agent, and 15-30% cornstarch, and 1-20% water.

2. The helmet insert of claim 1, wherein the ratio of the oil, the settling agent, the cornstarch and the water is 64% oil, 5% settling agent, 22% cornstarch, and 9% water.

3. The helmet insert of claim 1, wherein the oil is glycerin.

4. The helmet insert of claim 1, wherein the settling agent is dish detergent.

5. The helmet insert of claim 1, wherein the bladder member has a plurality of segments.

6. The helmet insert of claim 5, wherein the plurality of segments of the bladder member are connected to form one unitary piece.

7. The helmet insert of claim 1, wherein the bladder member has five segments.

8. The helmet insert of claim 1, wherein the insert is received in a helmet.

9. The helmet insert of claim 8, wherein the insert includes means for attaching the insert to the helmet.

10. The helmet insert of claim 9, wherein the attaching means is non-removable.

11. The helmet insert of claim 8, wherein the helmet is an athletic helmet.

12. The helmet insert of claim 1, wherein the non-Newtonian fluid responds relative to speed during impact thereby protecting a brain of a wearer of the helmet insert.

13. A method for producing a helmet insert, comprising:
providing a bladder member, an oil, a settling agent, cornstarch and water;
mixing the oil, the settling agent, the cornstarch and the water to form a non-Newtonian fluid;
opening the bladder member;
depositing the non-Newtonian fluid therein; and
closing the bladder member, wherein a ratio of the non-Newtonian fluid is in a weight range between 50-75% oil, 1-10% settling agent, 15-30% cornstarch, and 1-20% water.

14. The method of claim 13, wherein the weight range of the non-Newtonian fluid is 64% oil, 5% settling agent, 22% cornstarch, and 9% water.

* * * * *